United States Patent
Kumar et al.

(10) Patent No.: US 9,853,726 B2
(45) Date of Patent: Dec. 26, 2017

(54) WAVELENGTH COLLISION DETECTION IN CARRIER MULTIPLEXERS

(71) Applicant: Infinera Corporation, Annapolis Junction, MD (US)

(72) Inventors: Saurabh Kumar, Menlo Park, CA (US); Sanjeev Ramachandran, Bangalore (IN); Baranidhar Ramanathan, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/871,378

(22) Filed: Sep. 30, 2015

(65) Prior Publication Data

US 2017/0047992 A1    Feb. 16, 2017

(51) Int. Cl.
H04B 10/00 (2013.01)
H04B 10/079 (2013.01)
H04J 14/02 (2006.01)
H04B 10/572 (2013.01)

(52) U.S. Cl.
CPC ... *H04B 10/07955* (2013.01); *H04B 10/0797* (2013.01); *H04B 10/07957* (2013.01); *H04B 10/572* (2013.01); *H04J 14/0221* (2013.01); *H04J 14/0227* (2013.01)

(58) Field of Classification Search
CPC .......... H04B 10/07955; H04B 10/0797; H04L 43/16; H04J 14/0221
See application file for complete search history.

(56) References Cited

U.S. PATENT DOCUMENTS

| | | | |
|---|---|---|---|
| 2003/0156840 A1* | 8/2003 | Uchikata | H04J 14/0297 398/7 |
| 2004/0027384 A1* | 2/2004 | Levesque | H04L 43/00 715/771 |
| 2004/0037556 A1* | 2/2004 | Matz | H04B 10/032 398/40 |
| 2004/0081421 A1* | 4/2004 | Mori | H04B 10/506 385/140 |
| 2007/0014513 A1* | 1/2007 | Isomura | H04B 10/25073 385/24 |
| 2008/0089681 A1* | 4/2008 | Yano | H04B 10/07955 398/33 |
| 2008/0232738 A1* | 9/2008 | Yang | H04J 14/0206 385/24 |
| 2008/0240710 A1* | 10/2008 | Nishioka | H04B 10/03 398/5 |
| 2009/0082882 A1* | 3/2009 | Parfitt | G05B 19/054 700/14 |
| 2009/0116841 A1* | 5/2009 | Yang | H04J 14/0206 398/83 |
| 2009/0129773 A1* | 5/2009 | Oron | H04B 10/0793 398/10 |

(Continued)

*Primary Examiner* — Danny Leung
(74) *Attorney, Agent, or Firm* — David L. Soltz

(57) ABSTRACT

This disclosure relates to optical line system equipment, which enables wavelength addition for long haul transmission. The system is configured to prevent contention of wavelengths added into a multiplexer. For example, an optical wavelength combiner, such as a multiplexer, may include components that are configured to detect potential collisions between existing wavelengths and a newly added wavelength, and block the addition of the conflicting wavelength while alerting the operator.

9 Claims, 5 Drawing Sheets

(56) References Cited

U.S. PATENT DOCUMENTS

| | | | | |
|---|---|---|---|---|
| 2010/0166425 A1* | 7/2010 | Onaka | ................ | H04J 14/0221 398/79 |
| 2010/0239263 A1* | 9/2010 | Tokura | ................ | H04B 10/296 398/94 |
| 2014/0112661 A1* | 4/2014 | Sakane | .................. | H04J 14/02 398/38 |
| 2015/0304064 A1* | 10/2015 | Mutalik | ............. | H04J 14/0221 398/48 |

* cited by examiner

WAVELENGTH COLLISION DETECTION IN CARRIER MULTIPLEXERS

CLAIM OF PRIORITY UNDER 35 U.S.C. §119

The present Application for Patent claims priority to Provisional Application No. 4234/CHE/2015 entitled "Wavelength Collision Detection in Carrier Multiplexers" filed Aug. 14, 2015, and assigned to the assignee hereof and hereby expressly incorporated by reference herein.

FIELD OF DISCLOSURE

This disclosure relates generally to optical multiplexers and more specifically, but not exclusively, to wavelength collision detection in optical multiplexers.

BACKGROUND

Optical channel multiplexer are used to combine multiple optical carriers/wavelengths into a single carrier group, which may be transmitted over an optical line system, such as a long haul telecommunications network. A user or network operator adds carriers/wavelengths at a specifically designated port of a multiplexer module for combination. It is important to make sure the carrier/wavelength being added is added at the correct port to avoid wavelength collisions of frequency or power. For example, if a first wavelength at a first frequency is added to a first port and then a second wavelength at the first frequency is added to the first port as well, the first and second wavelength will interfere with each other (i.e. a wavelength collision will occur during the multiplexing by the multiplexer module) or if the second wavelength has a power level that will interfere with the first wavelength. However, conventional multiplexer modules do not restrict a user from adding specific wavelengths at input ports of the multiplexer module. It is possible for a user to add carriers at an incorrect input port of the multiplexer. The carrier introduced at the incorrect input port will impact the existing service and cause problems in the system. Thus, a technique to prevent incorrect wavelengths from being added in the multiplexers and an alarm for the user indicating such misconnections is needed.

Accordingly, there is a need for systems, apparatus, and methods that improve upon conventional approaches including the improved methods, system and apparatus provided hereby.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

In one aspect, a method for use with optical line system equipment includes enabling wavelength addition for long haul transmission that prevents collision or contention of wavelengths added into a multiplexer.

In another aspect, an apparatus includes a Channel Multiplexer Module (CMM) includes the necessary optical components to enable the software that detects possible wavelength collision by a newly added wavelength.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

Figure 1:
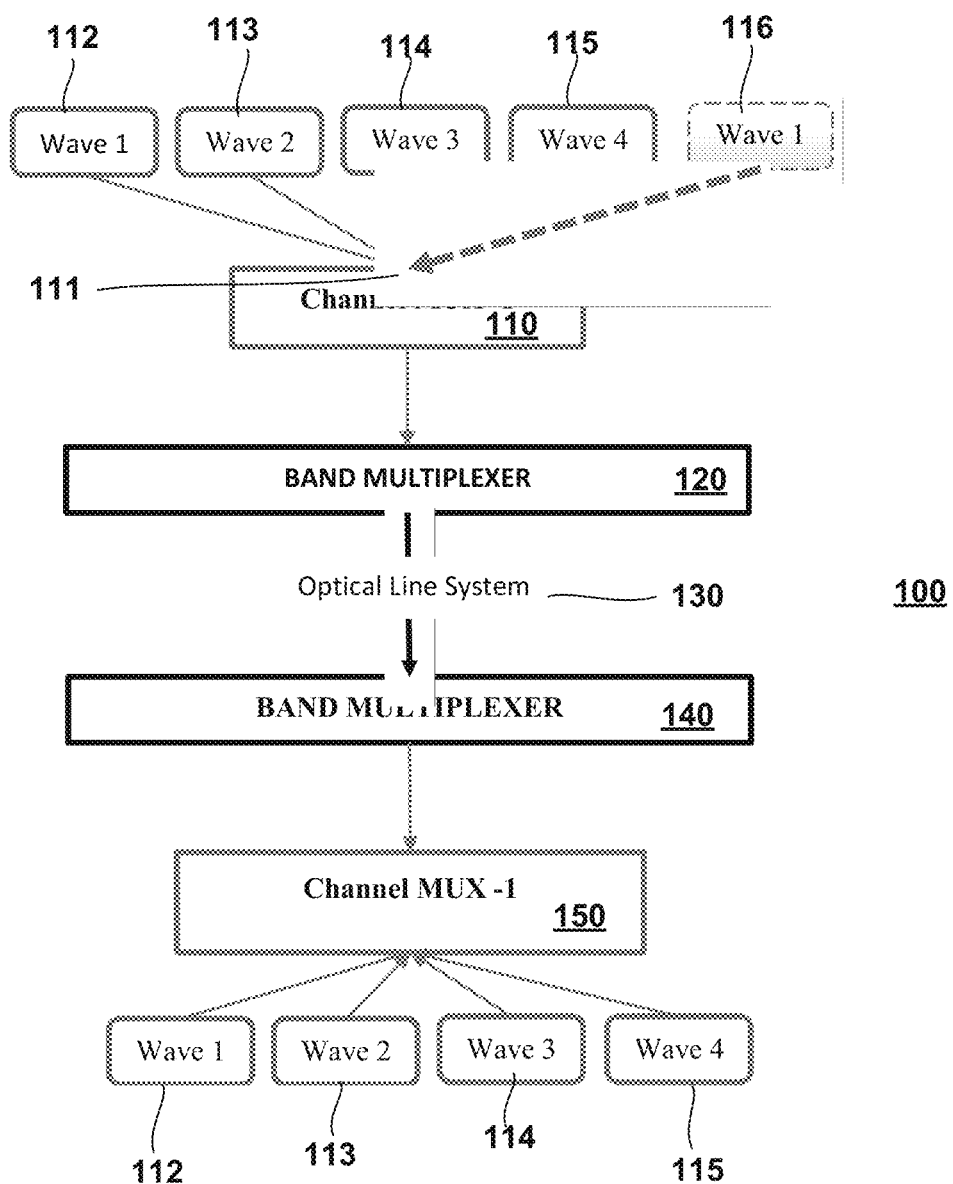
FIG. 1 illustrates an exemplary block diagram of a collision avoidance system with a single multiplexer in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

The exemplary methods, apparatus, and systems disclosed herein advantageously address the industry needs, as well as other previously unidentified needs, and mitigate shortcomings of the conventional methods, apparatus, and systems. For example One example of the disclosure applies to optical line system equipment, which enables wavelength addition for long haul transmission. It is configured to prevent contention of wavelengths added into the multiplexer. The channel multiplexer module includes necessary optical components to enable the software that detects possible wavelength collision by a newly added wavelength.

FIG. 1 illustrates an exemplary block diagram of a collision avoidance system with a single multiplexer in accordance with some examples of the disclosure. As shown in FIG. 1, a collision avoidance system 100 may include a first optical wavelength combiner 110 (e.g. a multiplexer) with an input port 111 configured to input optical wavelengths such as a first optical wavelength 112, a second optical wavelength 113, a third optical wavelength 114, a fourth optical wavelength 115, and a fifth optical wavelength 116.

In one example, the first through fourth optical wavelengths 112-115 are already coupled to the input port 111 with the first optical wavelength 112 and the fifth optical wavelength having incompatible frequencies (e.g. both wavelengths have the same frequency, mutually interfering frequencies, or incompatible power levels). When the fifth optical wavelength is coupled to the input port 111, the combiner 110 determines if the newly added wavelength, in this case the fifth optical wavelength 116, conflicts with any wavelengths already coupled to the input port 111. If so, the combiner 110 will block the fifth optical wavelength 116 from being combined with the other wavelengths and passing through the combiner into the system and initiates an alarm for the user or operator alerting the operator of the blocked wavelength.

While only one input port is described, the combiner may include more than one input port and check for potential collisions among the multiple input ports. The system 100 may include a first band multiplexer 120 coupled to the first optical wavelength combiner 110 to receive the combined wavelength output of the first optical wavelength combiner 110 as well as other optical wavelength combiners that may be present. The first band multiplexer 120 combines all received optical wavelengths and output them to an optical line system 130 (e.g. a long haul optical communications network). After traversing a portion of the optical line system 130, the transmitted output may be received by a second band multiplexer 140 that divides the transmitted output and selectively sends a portion to one or more combiners such as a second optical wavelength combiner 150. The second optical wavelength combiner 150 divides the received wavelengths into the first optical wavelength 112, the second optical wavelength 113, the third optical wavelength 114, the fourth optical wavelength 115, and outputs them through an output port 151. While a one way system is shown and described, it should be understood that the system 100 may operate in either direction such that the second optical wavelength combiner 150 inputs the wavelengths for combination and sends them to the first optical wavelength combiner 110.

Figure 2:
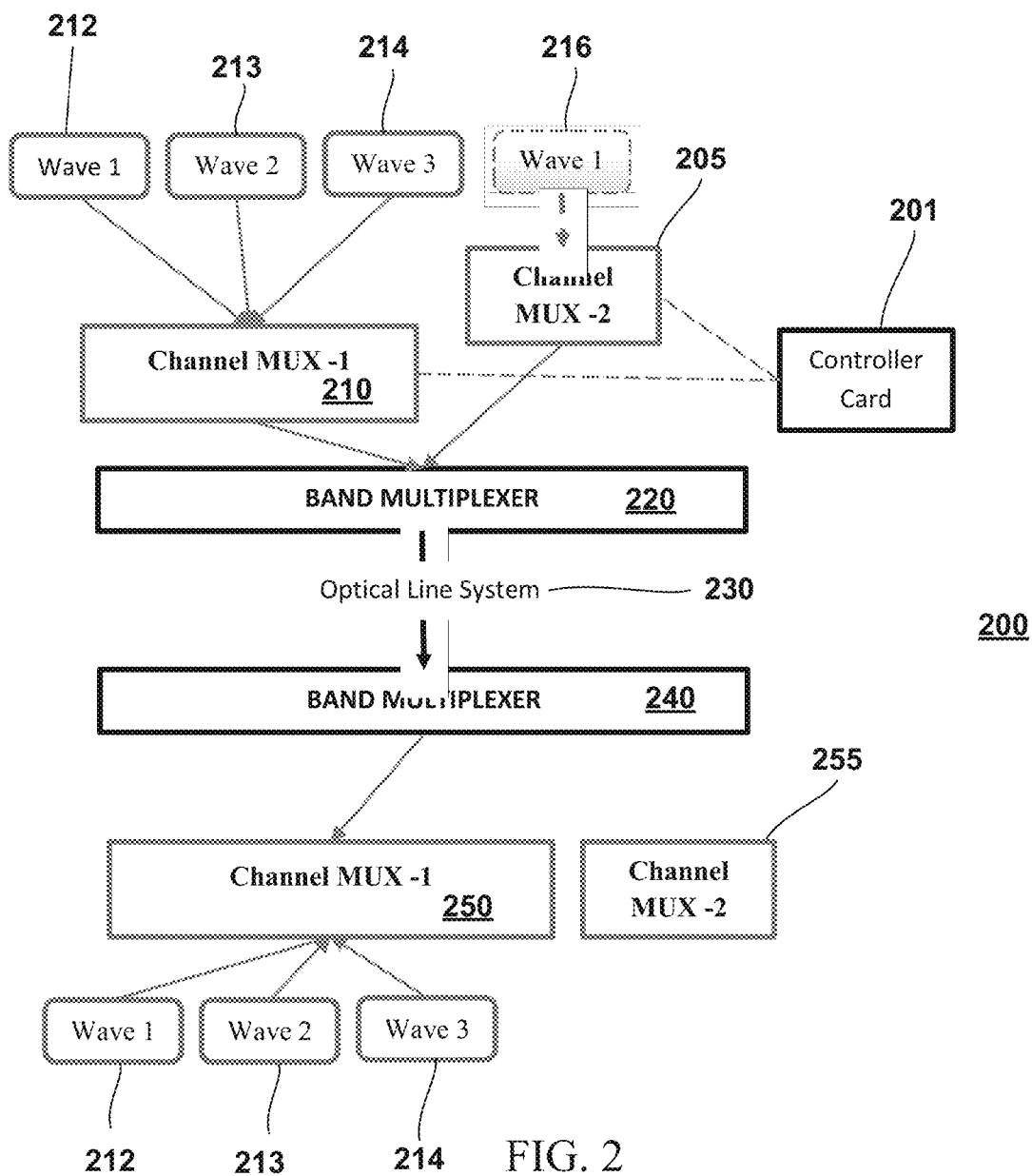
FIG. 2 illustrates another exemplary block diagram of a system with multiple multiplexers in accordance with some examples of the disclosure.

FIG. 2 illustrates another exemplary block diagram of a system with multiple multiplexers in accordance with some examples of the disclosure. As shown in FIG. 2, a collision avoidance system 200 may include a first optical wavelength combiner 210, a third optical wavelength combiner 205 both configured to respectively input optical wavelengths such as a first optical wavelength 212, a second optical wavelength 213, a third optical wavelength 214, and a fifth optical wavelength 216, a controller 201 communicatively connected to the first optical wavelength combiner 210 and the third optical wavelength combiner 205. In one example, the first through third optical wavelengths 212-214 are already coupled to the first optical wavelength combiner with the first optical wavelength 212 and the fifth optical wavelength 216 having incompatible frequencies (e.g. both wavelengths have the same frequency or incompatible frequencies or power). When the fifth optical wavelength 216 is coupled to the third optical wavelength combiner 205, the third optical wavelength combiner 205 notifies the controller 201. The controller 201, which may be aware of all the wavelengths coupled to both the first optical wavelength combiner 210 and the third optical wavelength combiner 205, determines if the newly added wavelength, in this case the fifth optical wavelength 216, conflicts with any wavelengths already coupled to either the first optical wavelength combiner 210 or the third optical wavelength combiner 205. If so, the controller 201 will signal the third optical wavelength combiner 205 to block the fifth optical wavelength 216 from being combined with the other wavelengths and passing through the combiner into the system and initiates an alarm for the user or operator alerting the operator of the blocked wavelength.

The system 200 may include a first band multiplexer 220 coupled to the first optical wavelength combiner 210 and the third optical wavelength combiner 205 to receive the combined wavelength output of each as well as other optical wavelength combiners that may be present. The first band multiplexer 220 combines all received optical wavelengths and output them to an optical line system 230 (e.g. a long haul optical communications network). After traversing a portion of the optical line system 230, the transmitted output may be received by a second band multiplexer 240 that divides the transmitted output and selectively sends a portion to one or more combiners such as a second optical wavelength combiner 250 (or a fourth optical wavelength combiner 255). The second optical wavelength combiner 250 divides the received wavelengths into the first optical wavelength 212, the second optical wavelength 213, the third optical wavelength 214, and outputs them. While a one way system is shown and described, it should be understood that the system 200 may operate in either direction such that the second optical wavelength combiner 250 inputs the wavelengths for combination and sends them to the first optical wavelength combiner 210, for example.

Figure 3:
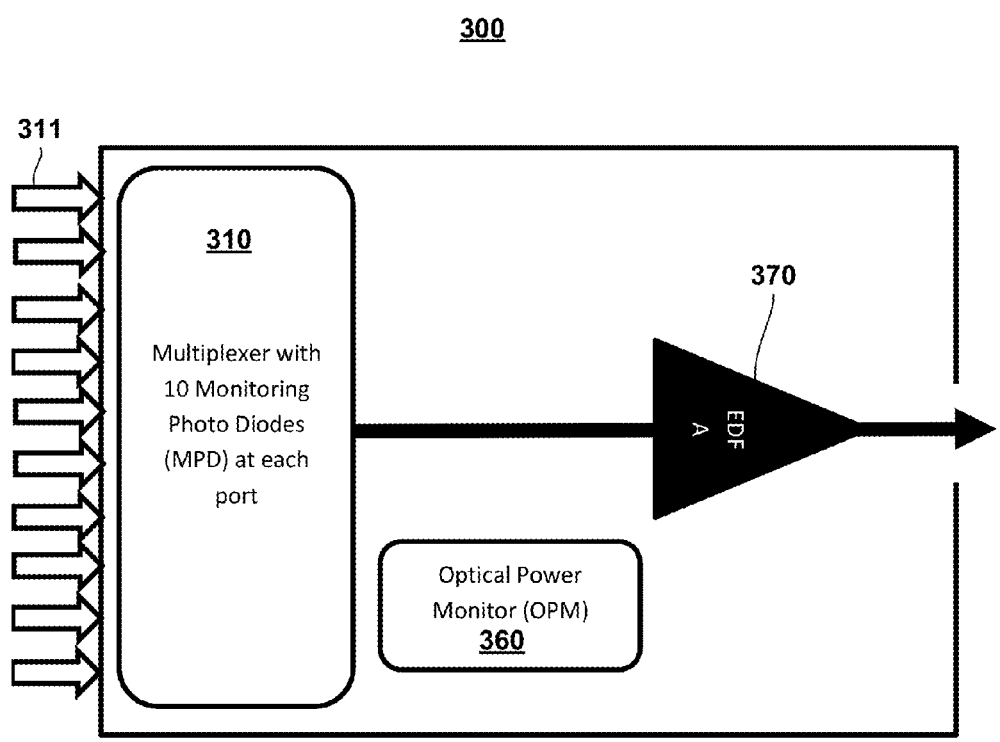
FIG. 3 illustrates an exemplary block diagram of a collision avoidance system in accordance with some examples of the disclosure.

FIG. 3 illustrates an exemplary block diagram of a collision avoidance system 300 in accordance with some examples of the disclosure. As shown in FIG. 3, the system 300 illustrates the components that may be used in the transmit path of a multiplexer. The system 300 may include a multiplexer 310 (e.g. first optical wavelength combiner 110 or first optical wavelength combiner 210) with ten monitoring photo diodes 311, one diode 311 at each input port, an optical power monitor 360 connected to the multiplexer 310 to monitor the optical power on each input port, and an optical wavelength amplifier 370 (e.g. erbium doped fiber amplifier or similar) configured to amplify the combined optical wavelengths output by the multiplexer 310. The optical power monitor 360 may be configured to send a signal to the multiplexer 310 if a wavelength added to any of the input port would create a wavelength collision or incompatibility with the existing wavelengths and the optical power monitor 360 may be configured to alert the user or system operator of the potential collision. The ten monitoring photo diodes 311 may detect the power of the wavelength plugged into any of the input ports. In addition, a variable optical amplifier (VOA), not shown, may be present at every input port to control the incoming power. This allows a range of frequencies on each input port. Each multiplexer 310 may support up to twenty different frequencies, for example. Each input port on the multiplexer module may map to a particular channel indexed in the OPM 360 for measurement.

Figure 4:
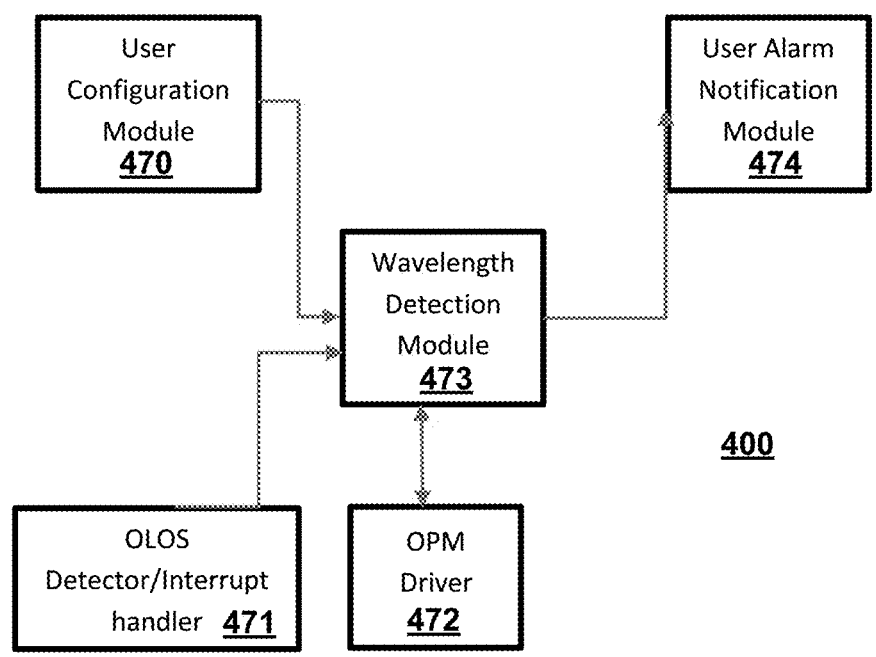
FIG. 4 illustrates another exemplary block diagram of a system in accordance with some examples of the disclosure.

FIG. 4 illustrates another exemplary block diagram of a system in accordance with some examples of the disclosure. As shown in FIG. 4, a collision avoidance system 400 may include a user configuration module 470 that allows a user or operator to configure the system 400 and thresholds etc., an optical loss of signal (OLOS) 471 detector/interrupt handler configured to detect and handle any interrupts, a wavelength detection module 473 configure to detect a wavelength and receive input from the user configuration module 470 and the OLOS 471, an optical power monitor 473 (e.g. OPM 360) configured to monitor the optical power of a wavelength and receives as well as provides input to the wavelength detection module 473, and a user alarm notification module 474 configured to alert the user or operator of a potential wavelength collision and receive input form the wavelength detection module 473. Each of these modules may be implemented in hardware, software, or a combination of the two.

One exemplary method of the operation of the collision avoidance system 400, may include the following actions (to be read in conjunction with FIG. 4), may be implemented in software, hardware, or both and may be used to aid the collision detection:

1. Identify whether a new wavelength has been plugged into an input port.
    a. OLOS clear interrupt is raised when a wavelength is added and the power level crosses the OLSO threshold.
2. Identify the possible frequency that can be passed through the on the port.
3. Configure OPM to handle open wave measurements
4. Configure OPM to handle the modulation format for that frequency.
5. Verify that the following conditions are met before performing the wave detection
    a. Wavelength is still alive, no OLOS reported.
    b. User has not changed the port configuration to non-open wave.
    c. User has not changed the modulation format of the expected wavelength.
6. Perform the following steps 5 times and calculate the average power.
    a. Identify the frequency supported on the port.
    b. Identify the OPM channel ID for the port.
    c. Read the power at the channel ID from the OPM.
7. Increase the VOA at the multiplexer input port by 5 dB.
8. Verify that the power measured at the channel ID from OPM is within reliable threshold limits.
9. Perform "step 6", to obtain the current power at the OPM.
10. If the difference between the power reading from "step 6" and "step 9", is greater than 3 dB and less than 7 dB, declare that the appropriate wavelength is detected.
11. Else report that an incorrect carrier/wavelength has been plugged into the multiplexer input.

Figure 5:
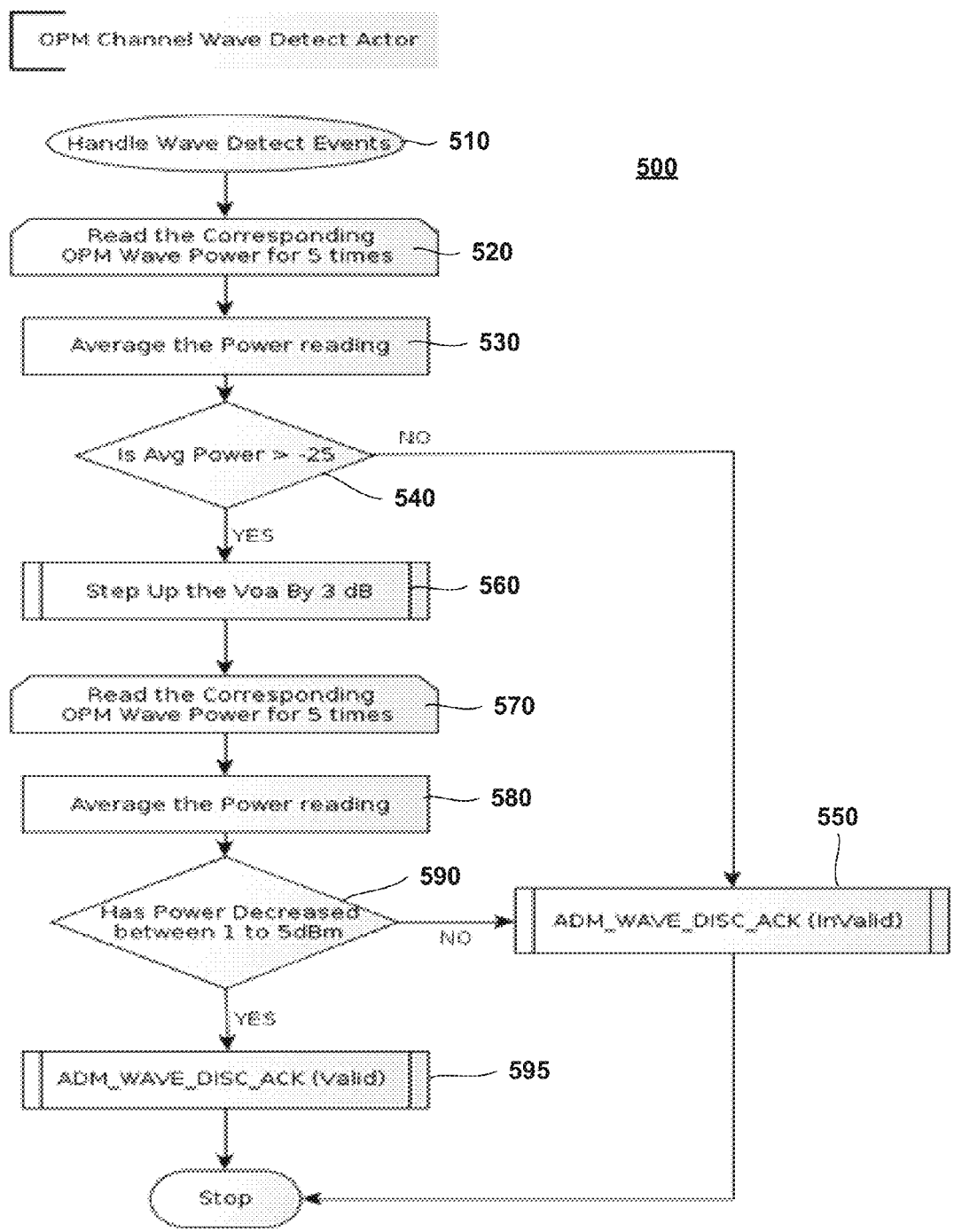
FIG. 5 illustrates an exemplary method of wavelength collision avoidance in accordance with some examples of the disclosure.

FIG. 5 illustrates an exemplary method of wavelength collision avoidance in accordance with some examples of the disclosure. As shown in FIG. 5, the partial process flow for avoiding a wavelength collision begins in block 510 with handling a wavelength detection event. Next in block 520, the wavelength power is read five times by an OPM. Next in block 530, the five readings are averaged. In block 540, a determination is made about whether the average power is greater than −25 dBm. If no, the process moves to block 550 and the wavelength is rejected or blocked and an alarm issued. If yes, the process moves to block 560 and a VOA coupled to the input port of the new wavelength is stepped up by 3 dB. Next in block 570, the wavelength power is again read five times by the OPM. Next in block 580, the five readings are averaged. In block 590, a determination is made about whether the average power has decreased between 1 to 5 dBm. If no, the process moves to block 550 and the wavelength is rejected or blocked and an alarm is issued. If yes, the process moves to block 595 and the wavelength is accepted.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

Further, those of skill in the art will appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Although some aspects have been described in connection with a device, it goes without saying that these aspects also constitute a description of the corresponding method, and so a block or a component of a device should also be understood as a corresponding method step or as a feature of a method step. Analogously thereto, aspects described in connection with or as a method step also constitute a description of a corresponding block or detail or feature of a corresponding device. Some or all of the method steps can be performed by a hardware apparatus (or using a hardware apparatus), such as, for example, a microprocessor, a programmable computer or an electronic circuit. In some examples, some or a plurality of the most important method steps can be performed by such an apparatus.

In the detailed description above it can be seen that different features are grouped together in examples. This manner of disclosure should not be understood as an intention that the claimed examples require more features than are explicitly mentioned in the respective claim. Rather, the situation is such that inventive content may reside in fewer than all features of an individual example disclosed. Therefore, the following claims should hereby be deemed to be incorporated in the description, wherein each claim by itself can stand as a separate example. Although each claim by itself can stand as a separate example, it should be noted that—although a dependent claim can refer in the claims to a specific combination with one or a plurality of claims—other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods disclosed in the description or in the claims can be implemented by a device comprising means for performing the respective steps or actions of this method.

Furthermore, in some examples, an individual step/action can be subdivided into a plurality of sub-steps or contain a plurality of sub-steps. Such sub-steps can be contained in the disclosure of the individual step and be part of the disclosure of the individual step.

While the foregoing disclosure shows illustrative examples of the disclosure, it should be noted that various changes and modifications could be made herein without departing from the scope of the disclosure as defined by the appended claims. The functions, steps and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A method for determining whether an optical signal has been supplied to a desired port of a module, the method comprising:
   detecting a wavelength of an optical signal;
   determining a first plurality of first power levels Of the optical signal;
   determining an average of the plurality of first power levels;
   attenuate the optical signal to impart a predetermined loss to the optical signal;
   determining a second power level of the attenuated optical signal;
   determining whether a difference between the average of the plurality of first power levels and the second power level is within a predetermined range; and
   generating an indication that the optical signal has not been supplied to the desired port if the difference is outside the predetermined range.

2. The method of claim 1, wherein a number of the plurality of power levels is five.

3. The method of claim 1, further including amplifying the optical by approximately 3 dB.

4. The method of claim 1, wherein determining the second power level includes determining if the second power level is lower than the first power by at least approximately 1 to 5 dBm.

5. An apparatus comprising:
   a first optical wavelength combiner having a first input configured to input optical wavelengths;
   an optical power monitor configured to detect a first power of an optical wavelength coupled to the first input and determine if the first power is below a threshold; and an alarm module configured to signal a first alarm if the first power is above the threshold and block the first input, wherein the first optical wavelength combiner includes a second input configured to input optical wavelengths, the optical power monitor is configured to detect a second power of an optical wavelength coupled to the second input and determine if the second power is below a threshold, and the alarm module is configured to signal a second alarm if the second power is above the threshold and block the second input, wherein the optical power monitor is further configured to determine the first power five times, determine an average first power, and determine if the average first power exceeds the threshold.

6. The apparatus of claim 5, wherein the optical power monitor is further configured to determine the second power five times, determine an average second power, and determine if the average second power exceeds the threshold.

7. The apparatus of claim 6, further comprising an optical amplifier configured to amplify the first optical wavelength.

8. The apparatus of claim 7, wherein the optical amplifier if further configured to amplify the first optical wavelength by approximately 3 dB.

9. The apparatus of claim 8, wherein the optical power monitor is configured to determine if the second power is lower than the first power by at least approximately 1 to 5 dBm.

* * * * *